United States Patent
Zeuch et al.

(10) Patent No.: US 7,800,877 B2
(45) Date of Patent: Sep. 21, 2010

(54) METHOD AND ELECTRONIC POWER SUPPLY DEVICE FOR SUPPLYING POWER TO A LOW-VOLTAGE LOAD PROTECTED BY A PROTECTIVE DEVICE

(75) Inventors: Jochen Zeuch, Blomberg (DE);
Hartmut Henkel, Blomberg (DE);
Michael Heinemann, Lage (DE)

(73) Assignee: Phoenix Contact GmbH & Co. KG (DE)

( * ) Notice: Subject to any disclaimer, the term of this patent is extended or adjusted under 35 U.S.C. 154(b) by 391 days.

(21) Appl. No.: 11/479,710

(22) Filed: Jun. 30, 2006

(65) Prior Publication Data

US 2007/0008664 A1   Jan. 11, 2007

(30) Foreign Application Priority Data

Jul. 6, 2005   (DE) ................. 10 2005 031 833

(51) Int. Cl.
*H02H 3/24* (2006.01)
(52) U.S. Cl. ............................................ 361/92
(58) Field of Classification Search ............ 361/92, 361/93.9
See application file for complete search history.

(56) References Cited

U.S. PATENT DOCUMENTS

| | | | | |
|---|---|---|---|---|
| 3,319,127 A | * | 5/1967 | Zocholl et al. | 361/96 |
| 4,293,902 A | * | 10/1981 | White | 363/26 |
| 4,736,264 A | * | 4/1988 | Segger | 361/18 |
| 5,841,618 A | * | 11/1998 | Dilkes et al. | 361/110 |
| 6,040,640 A | * | 3/2000 | Gehre et al. | 307/66 |
| 7,400,063 B2 | * | 7/2008 | Iwashita | 307/31 |
| 2004/0100740 A1 | * | 5/2004 | Iwashita | 361/18 |

FOREIGN PATENT DOCUMENTS

| | | |
|---|---|---|
| DE | 296 17 362 U1 | 1/1997 |
| DE | 197 38 696 A1 | 3/1999 |
| EP | 0 993 091 A2 | 4/2000 |
| JP | 1047218 | 2/1989 |
| JP | 8256475 | 10/1996 |
| JP | 9308079 | 11/1997 |

OTHER PUBLICATIONS

A. Ishikawa, "Japan Patent Application No. 2006-186162 Office Action", Oct. 10, 2008, Publisher: Japanese Patent Office, Published in: JP.

* cited by examiner

*Primary Examiner*—Ronald W Leja
(74) *Attorney, Agent, or Firm*—DeMont & Breyer LLC

(57) ABSTRACT

The invention relates to an electronic power supply device, particularly a switched-mode power supply, for supplying power to a low-voltage load protected by a protective device, and to a method therefor. The invention also relates to a device for protecting a low-voltage load against an excess current and to an auxiliary power supply device for use with such a protection device. The conceptual core of the invention can be seen in providing measures which ensure that after a fault has been detected, for example a short circuit at the output, a current is supplied for a short period, for example 15 ms, which is of such a magnitude that a protective device can be reliably and quickly tripped. The period for this is selected in such a manner that electronic components, connected loads and feedlines are not damaged and destroyed.

18 Claims, 3 Drawing Sheets

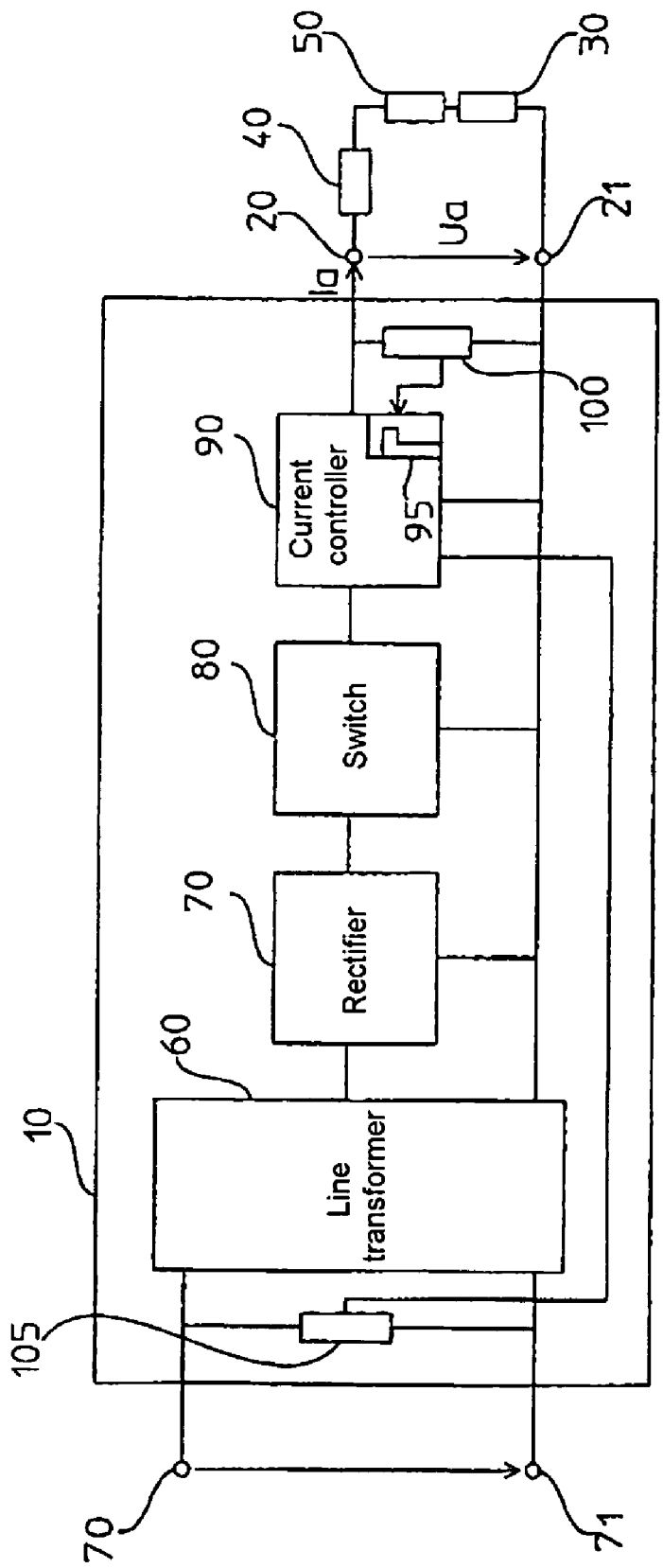
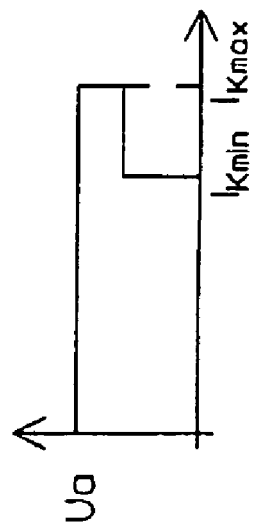
Fig.1
Fig.2

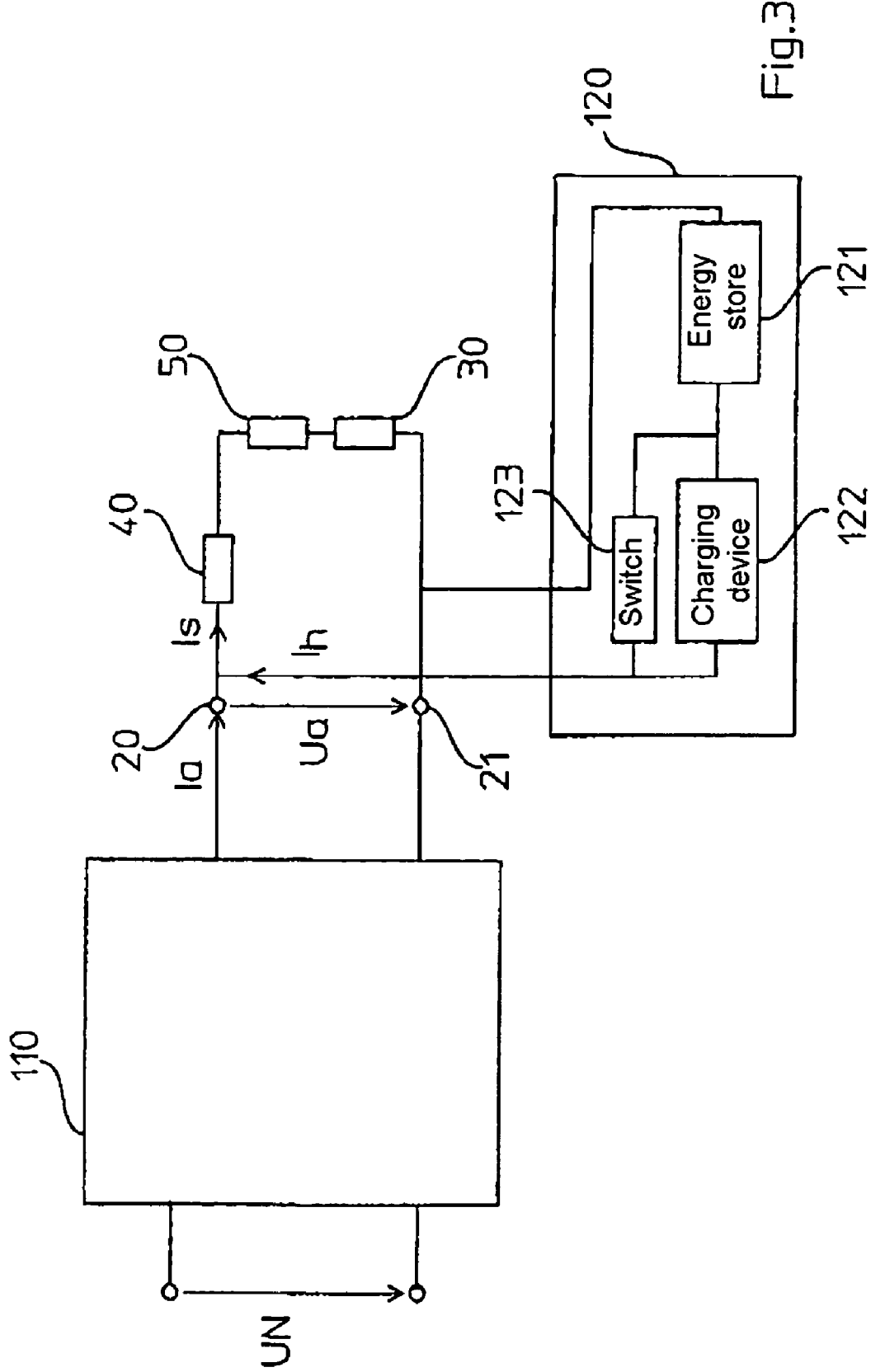

METHOD AND ELECTRONIC POWER SUPPLY DEVICE FOR SUPPLYING POWER TO A LOW-VOLTAGE LOAD PROTECTED BY A PROTECTIVE DEVICE

FIELD OF THE INVENTION

The invention relates to an electronic power supply device, particularly a switched-mode power supply, for supplying power to a low-voltage load protected by a protective device, and to a method therefor. The invention also relates to a device for protecting a low-voltage load against an over-current and to an auxiliary power supply device for use with such a protection device.

BACKGROUND OF THE INVENTION

In industrial plants, low-voltage loads such as, e.g. controllers, amplifiers and the like, are supplied with a direct voltage of preferably 24 Volts, which is harmless to persons. Suitable power supply devices which provide such a direct voltage can supply output currents of 20 A and more. At such high currents, protection devices such as, e.g. fuses or circuit breakers, must be connected in series with the respective loads in order to protect these and, in particular, the feedlines, against thermal overload and short-circuit currents. In order to be able to trip circuit breakers reliably magnetically in the event of an electrical fault, for example a short circuit, tripping currents are required which amount to about 7.5-times the nominal current specified with regard to the power supply device. The tripping characteristic of circuit breakers is the result of their time/current tripping characteristic such as, for example, the class-B characteristic. With the usual dimensioning, such high tripping currents for circuit breakers can be supplied in the event of a short circuit by traditional 50 Hz transformers used as power supply devices.

Due to high electrical losses and the great weight, such 50 Hz transformers are more and more frequently replaced by electronic power supply devices such as, e.g. switched-mode power supplies and transformer power supplies clocked at high frequency in industrial power supplies. However, electronic power supply devices usually is limit the output current very rapidly when an electrical fault occurs, that is to say within between 10 and 100 μsec, to 1.1- to 1.5-times the value of the nominal current in order to protect loads and feedlines against thermal overloads and short-circuit currents. Although electronic power supply devices are on the market which can also generate an output current of up to 2.5-times the nominal current for a short time, that is to say up to 4 seconds, these low currents are not adequate for reliably and safely tripping circuit breakers magnetically.

SUMMARY OF THE INVENTION

Accordingly, the present invention is based on the object of providing an electronic power supply device, a protection device, an auxiliary power supply device and a method for supplying power to a low-voltage load, protected by a protective device, which enable protective devices, particularly electromagnetic circuit breakers, to be rapidly tripped even when electronic power supply devices are used.

The conceptual core of the invention can be seen in providing measures which ensure that after a fault has been detected, for example a short circuit at the output, a current is supplied for a short period, for example 15 ms, which is of such a magnitude that a protective device can be reliably and quickly tripped. The period for this is selected in such a manner that electronic components, connected loads and feedlines are not damaged and destroyed.

Accordingly, an electrical power supply device, is particularly a switched-mode power supply or a transformer current device clocked at high frequency is provided for supplying power to a low-voltage load. The electronic power supply device comprises a transformer, a device for detecting an electrical incident or fault such as, for example, a short circuit, and a device allocated to the detecting device for limiting the output current of the device to a first predetermined value, i.e. approximately to 1.1- to 2-times the nominal current of the power supply device. Furthermore, a device is provided which, when responding to the detection of a fault, sets the output current to a second predetermined value which is greater than the first predetermined value for a predetermined period, in such a manner that a protective device allocated to the electrical power supply device can be reliably tripped. The limiting device is constructed in such a manner that it limits the output current to the first predetermined value after the predetermined time has elapsed.

The protective or protection device is connected externally to the electronic power supply device in a manner known per se and is thus connected in series with the low-voltage load. To be able to implement a compact electronic power supply device for supplying power to a protected low-voltage load, the protective device can also be arranged in the electronic power supply device.

The protective device is preferably a circuit breaker which can be electromagnetically tripped.

To achieve safe and reliable tripping of the protective device in the event of a fault, the current setting or adjusting device supplies an output current which is approximately between 5- to 10-times the nominal current of the power supply device. As a rule, the limiting device supplies a first predetermined current value which is approximately between 1.1- to 1.5-times the nominal current of the electronic power supply device.

To prevent the low-voltage load and the feedlines from being overloaded in the event of a fault, for example of a short circuit, the current setting device supplies an increased output current, for instance, for 5 to 15 ms. The increased output current can also flow for a shorter or longer time.

Considered as a circuit, the current setting device providing the increased output current, together with the limiting device, can form a current control device. In this case, the solution to the above-mentioned technical problem can also be seen in that the current control device used normally in an electronic power supply device has a two-stage current limiting characteristic. The current control device then ensures that when an electrical fault occurs, an increased output current of, for example, 7-times the nominal current initially flows for a short time and then the "normal" limited output current with about 1.1-times the nominal current flows.

The detecting device for detecting an electrical fault preferably comprises a first detector for detecting a drop in the output voltage below a threshold value and/or a second detector for detecting a drop in the input voltage below a threshold value. This makes it possible to detect a short circuit because, as is known, the voltage drops is when a short circuit occurs.

The above-mentioned technical problem is also solved by a device for protecting a low-voltage load against an excess current. Accordingly, the protection device exhibits a main power supply device which has a transformer, a device for detecting an electrical fault and a device allocated to the detecting device for limiting the output current when responding to a detected fault. Furthermore, the main power supply device is associated with an auxiliary power supply device which can be switched in and which exhibits a device for detecting an electrical fault, particularly the drop in the output voltage of the main power supply device below a threshold value, and a device for providing a predetermined current for an adjustable time. Furthermore, a protective device which can be electrically connected to the auxiliary power supply device is provided, the current provided by the auxiliary power supply device being dimensioned in such a manner that when a fault is detected, the protective device is reliably tripped.

According to a particular embodiment, the auxiliary power supply device is implemented in the main power supply device or is connected externally to the main power supply device.

The auxiliary power supply device can be any energy store but preferably at least a capacitive and/or inductive energy store.

In order to automatically connect the auxiliary power supply device to the main power supply device when a fault occurs, the auxiliary power supply device exhibits a switching device which is activated when responding to a detected fault, particularly to the drop in the output voltage of the main power supply device below a threshold value.

An advantageous development provides that the auxiliary power supply device exhibits a device for charging the capacitive and/or inductive energy store. The charging device is constructed in such a manner that it charges the energy store at the times at which no fault has occurred.

The main power supply device is preferably a switched-mode power supply.

The detecting device for detecting an electrical fault preferably comprises a first detector for detecting a drop in the output voltage below a threshold value and/or a second detector for detecting a drop in the input voltage below a threshold value. This makes it possible to detect a short circuit.

The above-mentioned technical problem is also solved by means of an auxiliary power supply device for use with a protection device. The auxiliary power supply device comprises a device for detecting a drop in the output voltage of a main power supply device below a threshold value and a device which, when responding to a detected drop in the output voltage, supplies a predetermined current for an adjustable time so that a protective device can be reliably tripped.

Accordingly, a load protected by a protective device is supplied with a low voltage with the aid of an electronic power supply device, particularly a switched-mode power supply. According to the method, the input and/or output voltage of the power supply device is monitored in order to detect a drop in the input and/or output voltage below a threshold value. If a drop in the input and/or output voltage below the threshold value is detected, a current is provided for a predetermined time, the magnitude of which is dimensioned in such a manner that the protective device can be reliably tripped. After the predetermined time has elapsed, the current is limited to a lower value.

BRIEF DESCRIPTION OF THE DRAWINGS

In the text which follows, the invention will be explained in greater detail by means of a number of exemplary embodiments, in conjunction with the attached drawings, in which:

FIG. 1 shows a power supply system for protectively supplying a low-voltage load with power according to a first embodiment, FIG. 2 shows a two-step current limiting characteristic for the current controller shown in FIG. 1, FIG. 3 shows an alternative power supply system for feeding a low-voltage load in a protected manner.

DETAILED DESCRIPTION

Figure 5:
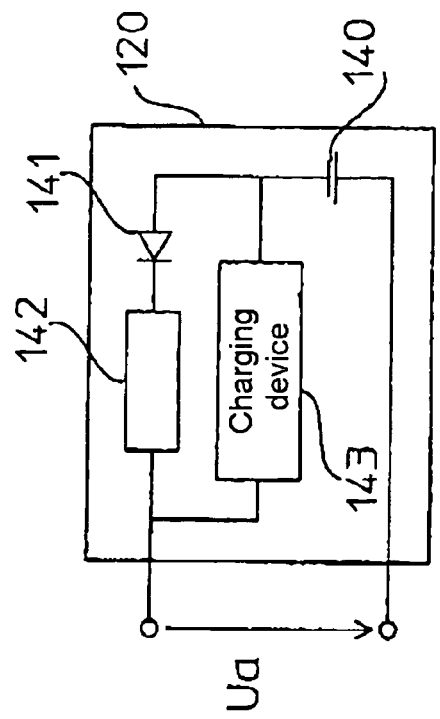
FIG. 5 shows an inductive auxiliary power supply device which is used in a power supply system according to FIG. 3.

FIG. 1 shows an exemplary power supply system comprising an electronic power supply device 10, at the output terminals 20 and 21 of which a low-voltage load is connected which is symbolically represented by a resistor 30. The resistance of the feedline to the low-voltage load 30 is taken into consideration by the resistor 40. Furthermore, a protective device, an electromagnetic circuit breaker 50 in the present example, is connected in series with the low-voltage load 30. The electronic power supply device 10 provides, for example, a direct voltage $u_a$ of 24 V at the output terminals 20, 21. Although only one low-voltage load 30 is connected to the electronic power supply device 10 in FIG. 1, a number of loads can naturally be connected preferably in parallel to the electronic power supply device 10. A separate circuit breaker can then be allocated to each load.

The electronic power supply device 10 can be a switched-mode power supply which is supplied via a line voltage $U_N$. The power supply device 10 conventionally contains a line transformer 60 associated with the input terminals 70 and 71, a rectifier circuit 70 and a circuit breaker 80. Furthermore, a current controller 90 is provided which can be modified in accordance with the invention. The current controller 90 is normally used for limiting the output current $i_a$ to 1.1- to 1.5-times the nominal current of the power supply device 10 in the event of a fault, for example a short circuit at the output. This limited output current is called $i_{kmin}$ in conformance with the current/voltage output characteristic of the modified current controller 90, shown in FIG. 2.

The circuit breaker 50 is used for protecting the feedline, represented by the resistor 40, and the low-voltage load 30 against thermal overload or short circuit currents. A problem of conventional electronic power supply devices consists in that, in the event of a fault, for example in the event of a short circuit, the output voltage $u_a$ of the power supply device 10 can collapse so that the limited output current $i_{kmin}$ normally supplied by the current controller 90 is not sufficient for magnetically tripping the circuit breaker 50.

It is thus the aim of the invention to modify a conventional power supply device in such a manner that, in the event of a fault, especially in the event of a short circuit at the output, it can supply an output current which is about 5- to 7-times the nominal current for a conformance with the current/voltage output characteristic of the modified current controller 90, shown in FIG. 2. Furthermore, the power supply device 10 must be constructed in such a manner that the excessive output current $i_{kmax}$ may only flow so long that the feedline 40 and the low-voltage load 30 are not damaged.

For this purpose, according to a preferred embodiment, the current controller 90 is modified in such a manner that it has a 2-step characteristic which has the variation shown in FIG. 2. For this purpose, the power supply device 10 is implemented in such a manner that, in the event of a fault, particularly of a short circuit, it holds the output voltage at the operating voltage $u_a$ for a short time—for instance 5 to 15 ms—in order to be able to provide the current $i_{kmax}$. This output current $i_{kmax}$ is required for being able to trip the circuit breaker 50 reliably and quickly. The time during which the increased output current $i_{kmax}$ flows can be adjusted by corresponding RC elements. This time can also be selected to be shorter or longer depending on the dimensioning of the circuit breaker 30, the low-voltage load and the feedlines. After this period has elapsed, the current limiter 90 enters into its usual protective mechanism and limits the output current $i_a$ to the output current $i_{kmin}$ which, as mentioned, approximately corresponds to 1.1- to 1.5-times the nominal current. This functionality is shown diagrammatically by the function block 95 in FIG. 1.

To implement the characteristic shown in FIG. 2, a large variety of circuit modifications with regard to the electronic power supply device 10 and especially the current controller 90 are conceivable. The two-step current/voltage output characteristic can be achieved, for example, by widening the analogue controlled system of a conventional current controller by additional operational amplifiers for limiting the output current to the value $i_{kmax}$ and by integrating further delay elements which ensure that the limiting of the output current is reduced again to the usual value $i_{kmin}$ in the event of a fault. Since electronic power supply devices also operate with microprocessor control today, the current/voltage output characteristics shown in FIG. 2 can also be implemented by suitable software. In this arrangement, the nominal signal for the maximum output current $i_{kmax}$ is generated, as a rule, by a microprocessor.

The low-voltage load 30 and the connected lines are not thermally overloaded by the current pulse of magnitude lasting only a few milliseconds. The components of the power supply device 10 such as, for example, the switch 80 and the rectifier diodes of the rectifier circuit 70, are also selected in such a manner that a short-time increase in current does not entail any significant thermal loading of the components and cabling.

If the current controller 90 is controlled periodically, however, the components can be overloaded by the excessive short-circuit current $i_{kmax}$ due to the periodic loading of the components. The periodic trigger times for the current controller 90 can be correspondingly restricted or controlled, for example, by a microprocessor, which is not shown.

In the present example, a fault case, for example a short circuit at the output, is detected by means of a detector 100 connected to the output terminals 20 and 21. The detector 100 is implemented in such a manner that it can monitor the output voltage $u_a$ of the power supply device 10 and can inform the current controller 90 when the output voltage $u_a$ has fallen below a predetermined threshold value. The input voltage $u_N$ of the power supply device 10, present at the input terminals 70 and 71, is preferably also monitored by means of a detector 105. The detector 105 is constructed, for example, in such a manner that it can detect when the input voltage $u_N$ drops below a threshold value. As soon as the detector 105 detects that it has dropped below the threshold value, the current controller 90 is activated.

In the text which follows, the operation of the electronic power supply device 10, shown in FIG. 1, is explained in greater detail in conjunction with FIG. 2.

Let it be assumed that the voltage detector 105 has detected a short circuit in the power supply at the input of the power supply device 10 since the input voltage $u_N$ has dropped below the threshold value set. The detector 105 thereupon activates the current controller 90 which provides the output current $i_{kmax}$ in accordance with its current/voltage output characteristic. The output current $i_{kmax}$ is provided for about 5 to 15 ms and ensures that the electromagnetic circuit breaker 50 is reliably tripped as a result of which the low-voltage load 30 is disconnected from the power supply device 10. Following this, the normal control operation of the current controller 90 starts which limits the output current to the value $i_{kmin}$.

FIG. 3 quite generally shows an alternative system for supplying power to a low-voltage load 30, identical reference symbols being used for components which correspond to the components shown in FIG. 1. Accordingly, a conventional electronic power supply device 110 is again connected with its input to a line voltage $u_N$. At the output terminals 20 and 21 of the electronic power supply device 110, the circuit breaker 50 and a low-voltage load 30 are connected in series. The feedline to the low-voltage load is symbolically shown by the feedline resistance 40. The alternative system shown in FIG. 3 is again intended for achieving the aim that, in the event of an electrical fault, particularly of a short circuit, the circuit breaker 50 can be tripped quickly and reliably. It should first be mentioned that the electronic power supply device 110, known per se, exhibits a line transformer, a rectifier circuit, a circuit breaker and a corresponding current controller as current limiter, as already shown in FIG. 1. Furthermore, detectors similar to the detectors 100 and 105 shown in FIG. 1 can be provided in the electronic power supply device which detects electrical faults, for example short circuits. To be able to ensure a reliable magnetic tripping of the circuit breaker 50 in the event of an electrical fault, an auxiliary power supply device 120 is connected in parallel with the output terminals 20 and 21 of the electronic power supply device 110. Shown diagrammatically, the auxiliary power supply device 120 contains an energy storage device 121 which can have one or more capacitors and/or inductances, a charging device 122 for charging the energy storing device 121 and a switching device 123 which, when an electrical fault is detected, discharges the store 121 in order to be able to generate for a short time a summation current $i_s$ of such magnitude that the circuit breaker 50 is tripped. The summation current $i_s$ is preferably 5- to 7-times the nominal current of the power supply device 110.

Figure 4:
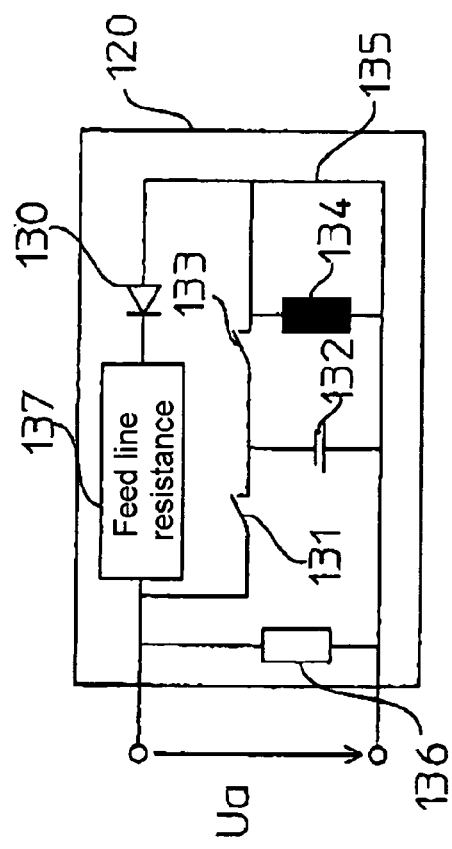
FIG. 4 shows a capacitive auxiliary power supply device which is used in a power supply system according to FIG. 3.

FIG. 4 shows a technical implementation of the auxiliary power supply device 120 shown in FIG. 3. Accordingly, the auxiliary power supply device 120 exhibits a diode 130 as switching device. A capacitor 132 is connected in parallel with the input terminals via a switch 131. A coil 134 is connected in parallel with the capacitor 132 as energy store via a further switch 133. The coil 134 can be discharged via the diode 130 by means of a switch 135. In the text which follows, the operation of the arrangement shown in FIG. 3 is explained in greater detail in conjunction with the auxiliary power supply is device 120 shown in FIG. 4.

In normal operation, the switch 135 is closed. The switch 131 is closed and opened in mutual interaction with the switch 132 so that initially the capacitor 132 is charged up via the output voltage $u_a$ of the power supply device 110 and is then discharged into the coil 134 by closing the switch 133. The closed switch 135 ensures that the coil current only flows in the auxiliary power supply device 120. A detector 136 connected between the input terminals of the auxiliary power supply device 120 monitors the output voltage $u_a$ of the power supply device 110. As soon as the detector 136 detects that the output voltage of the power supply device 110 has dropped below a threshold value, the detector 136 initiates the opening of the switch 135 so that the coil 134 can be demagnetized as a result of which the stored energy can flow off to the circuit breaker 30 as auxiliary current $i_h$. In response to the voltage drop at the output terminals 20 and 21, the current controller 90 of the power supply device 110 limits the output current $i_a$ to 1.1- to 1.5-times the nominal current in a manner known per se. Due to the auxiliary power supply device 120, however, a summation current $i_s$, which is formed by the limited output current $i_{kmin}$ and the auxiliary current $i_h$ of the auxiliary power supply device 120, is provided for a short time. The summation current $i_s$ is sufficient for reliably tripping the circuit breaker 30. After about 15 ms, the switch 135 of the auxiliary power supply device 120 is closed again and the coil 134 is correspondingly charged up. If necessary, the auxiliary power supply device 120 can be cyclically switched in.

The auxiliary power supply device 120 shown in FIG. 3 can also be implemented by a capacitive energy store. For this purpose, FIG. 5 shows a corresponding circuit arrangement. Accordingly, a capacitor 140 is connected to the output terminals 20 and 21 of the power supply device 110 via a diode 141. The feedline to the capacitor 140 is shown symbolically by a feedline resistor 142. A charging device 143 is used for correspondingly charging the capacitor 140. To be able to provide the currents required for reliably tripping the circuit breaker 50, capacitors having a high capacitance, for example with a capacitance of about 350 F are used. The diode 141 is used as controlled switch which ensures that the capacitor 140 is discharged as soon as the output voltage $u_a$ of the power supply device 110 becomes less than the voltage present across the capacitor 140. The diode 141, the cathode of which is connected to the output terminal 20 of the power supply device 110 and the anode of which is connected to the capacitor 140, thus ensures that when a short circuit is detected at the output of the power supply device 110, the capacitor 140 is automatically connected to the power supply device 110. At the same time, the diode 141 prevents the capacitor 140 from being discharged in normal operation. It is important to point out that the two circuit variants shown in FIGS. 4 and 5 of the auxiliary power supply device 120 shown in FIG. 3 are constructed in such a manner that, after an electrical fault has been detected, they are connected to the power supply device 110 for a short time, that is to say, for instance for 5 to 15 ms, in order to produce a summation current $i_s$ which, for instance, is 5- to 7-times the nominal current of the power supply device 110 in order to ensure that the circuit breaker 50 reliably trips in the event of a fault.

What is claimed is:

1. An electronic power supply device (10) for supplying power to a low-voltage load (30), comprising:
    a transformer (60);
    a detecting device (100, 105) for detecting an electrical fault, wherein the detecting device comprises a first detector (105) for detecting a drop in the input voltage $u_N$ of the electronic power supply device below a first threshold value, the first detector being electrically connected to the transformer; and
    a limiting device (90) allocated to the detecting device (100, 105), for limiting the output current of the power supply device to a first predetermined value, wherein a current setting device (95) is provided which, in response to the detection of the electrical fault, sets the output current to a second predetermined value which is greater than the first predetermined value for a predetermined time, in such a manner that a protective device (50) allocated to the electronic power supply device (10) can be reliably tripped, and the limiting device (90) is constructed for limiting the output current to the first predetermined value after the predetermined time has elapsed, wherein the limiting device and the current setting device are part of a current control device.

2. The electronic power supply device as claimed in claim 1, wherein the protective device (50) is arranged in or can be electrically connected externally to the power supply device.

3. The electronic power supply device as claimed in claim 2, wherein the protective device (50) is a circuit breaker which can be electromagnetically tripped.

4. The electronic power supply device as claimed in claim 1, wherein the first predetermined current value is approximately between 1.1- to 1.5-times the nominal current of the power supply device and the second current value is approximately between 5- to 10-times the nominal current.

5. The electronic power supply device as claimed in claim 1, wherein the current setting device (95) supplies the increased output current for 5 to 15 ms.

6. The electronic power supply device as claimed in claim 1, wherein the detecting device further comprises a second detector (100) for detecting a drop in the output voltage $u_a$ below a second threshold value, and wherein the limiting device (90) is constructed for limiting the output current, based on at least one of: i) the first detector detecting a drop in the input voltage $u_N$ and ii) the second detector detecting a drop in the output voltage $u_a$.

7. A protection device for protecting a low-voltage load (30) against an over-current, comprising:
    a main power supply device (110) which has a transformer, a device for detecting an electrical fault and a device allocated to the detecting device for limiting the output current in response to a detected electrical fault;
    an auxiliary power supply device (120) comprising a device for detecting (136; 141) an electrical fault and a current providing device (134; 140) for providing a predetermined current for an adjustable time, wherein the device for detecting the electrical fault is electrically connected to the input terminals of the auxiliary power supply device, and wherein the auxiliary power supply device is constructed for charging the current providing device with the output voltage of the main power supply device, the output voltage being provided to the input terminals of the auxiliary power supply device; and
    a protective device (50) which can be electrically connected to the auxiliary power supply device (120), the current provided by the auxiliary power supply device (120) being dimensioned in such a manner that when the electrical fault is detected, the protective device (50) is reliably tripped.

8. The protection device as claimed in claim 7, wherein the auxiliary power supply device (120) is arranged in the main power supply device (110) or is electrically connected externally to the main power supply device (110).

9. The protection device as claimed in claim 7, wherein the current providing device of the auxiliary power supply device (120) comprises at least one capacitive and/or inductive energy store (134; 140).

10. The protection device as claimed in claim 9, wherein the auxiliary power supply device (120) further comprises a switching device (135; 141) which, in response to a detected electrical fault, automatically switches in the auxiliary power supply device (120).

11. The protection device as claimed in claim 9, wherein the auxiliary power supply device (120) further comprises a device (132; 143) for charging the capacitive and/or inductive energy store.

12. The protection device as claimed in claim 7, wherein the main power supply device (110) is a switched-mode power supply.

13. The protection device as claimed in claim 7, wherein the detecting device that is part of the main power supply device comprises a first detector for detecting a drop in the output voltage below a threshold value and/or a second detector for detecting a drop in the input voltage below a threshold value.

14. The protection device as claimed in claim 7, wherein the detecting device that is part of the auxiliary power supply device comprises a first detector for detecting a drop in the output voltage below a threshold value.

15. An auxiliary power supply device for use with a protective device (50), comprising:
   a device (136; 141) for detecting a drop in the output voltage of a main power supply device below a threshold value; and
   a current providing device (134; 140), which, in response to a detected drop in the output voltage, supplies a predetermined current for an adjustable time so that the protective device (50) can be reliably tripped;
   wherein the device for detecting the drop in the output voltage of the main power supply device below the threshold value is electrically connected to the input terminals of the auxiliary power supply device, and wherein the auxiliary power supply device is constructed for charging the current providing device with the output voltage of the main power supply device, the output voltage being provided to the input terminals of the auxiliary power supply device.

16. The auxiliary power supply device as claimed in claim 15, further comprising at least one capacitive and/or inductive energy store (134; 140).

17. The auxiliary power supply device as claimed in claim 16, further comprising a device (132; 143) for charging the capacitive and/or inductive energy store.

18. A method for supplying power to a low-voltage load (30), protected by a protective device (50), with the aid of an electronic power supply device (10; 110), the method comprising:
   monitoring the input and/or output voltage of the power supply device in order to detect a drop in the input and/or output voltage below a threshold value;
   when a drop in the input and/or output voltage below the threshold value is detected, providing a current for a predetermined time by a current control device, the magnitude of the current being dimensioned in such a manner that the protective device (50) is reliably tripped; and
   after the predetermined time has elapsed, limiting the current to a lower value than during the predetermined time, by the current control device.

* * * * *